(12) United States Patent
Lucas et al.

(10) Patent No.: US 11,618,793 B2
(45) Date of Patent: Apr. 4, 2023

(54) OPTIMIZED INERT GAS PARTIAL PRESSURE IN A GAS PHASE POLYMERIZATION PROCESS

(71) Applicant: ExxonMobil Chemical Patents Inc., Baytown, TX (US)

(72) Inventors: Michael D. Lucas, Houston, TX (US); Anne Bernard-Brunel, Le Havre (FR); Ryan W. Impelman, Houston, TX (US); Keng-Hua Beh, Singapore (SG); Diwaker Singh, Sr., Singapore (SG); Rui Hoong Chong, Singapore (SG); Corrine L. Brandl, Beaumont, TX (US); Luis A. Sotomayor, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/444,094

(22) Filed: Jul. 30, 2021

(65) Prior Publication Data

US 2022/0064343 A1 Mar. 3, 2022

Related U.S. Application Data

(60) Provisional application No. 63/071,304, filed on Aug. 27, 2020.

(51) Int. Cl.
*C08F 210/02* (2006.01)
(52) U.S. Cl.
CPC .................................. *C08F 210/02* (2013.01)

(58) Field of Classification Search
CPC ........ C08F 210/02; C08F 210/16; C08F 2/34; B01J 8/1809; B01J 2208/00539
See application file for complete search history.

(56) References Cited

U.S. PATENT DOCUMENTS

| | | | |
|---|---|---|---|
| 4,003,712 | A | 1/1977 | Miller |
| 4,011,382 | A | 3/1977 | Levine et al. |
| 4,086,408 | A | 4/1978 | Karol et al. |
| 4,303,771 | A | 12/1981 | Wagner et al. |
| 4,349,648 | A | 9/1982 | Jorgensen et al. |
| 5,352,749 | A | 10/1994 | Dechellis et al. |
| 6,063,877 | A | 5/2000 | Kocian et al. |
| 9,328,177 | B2 | 5/2016 | Moebus et al. |
| 9,410,001 | B2 | 8/2016 | Cai et al. |
| 2005/0137364 | A1 | 6/2005 | Cai et al. |

(Continued)

*Primary Examiner* — Ellen M McAvoy
(74) *Attorney, Agent, or Firm* — ExxonMobil Chemical Patents Inc.-Law Department (57) ABSTRACT

Gas phase polymerization processes include contacting an input stream comprising a monomer and an induced condensing agent in the presence of an inert gas with a catalyst in a fluidized bed reactor to produce a polymer, unreacted monomer, and an output gas; recycling a recycle stream of the unreacted monomer from the reactor to the input stream; venting at least a portion of the output gas from the reactor; and maintaining a partial pressure of the inert gas in the reactor above a reference inert gas pressure to decrease losses of the recycle stream with the vented output gas. The processes may include controlling the inert gas partial pressure to vary the total reactor pressure up to the maximum safe pressure, without causing carry-over of product polymer.

20 Claims, 1 Drawing Sheet

(56) References Cited

U.S. PATENT DOCUMENTS

| | | | |
|---|---|---|---|
| 2008/0319583 A1* | 12/2008 | Hagerty | C08F 10/00 700/269 |
| 2011/0269922 A1* | 11/2011 | Kang | B01J 8/1863 422/139 |
| 2012/0329962 A1* | 12/2012 | Markel | C08F 10/00 526/84 |
| 2015/0210782 A1* | 7/2015 | Hari | G16C 20/10 703/12 |
| 2016/0229933 A1* | 8/2016 | Van Egmond | C08F 110/06 |
| 2019/0218319 A1 | 7/2019 | Pannel | |
| 2019/0336930 A1* | 11/2019 | Balestra | C08F 2/44 |
| 2021/0102009 A1* | 4/2021 | Mei | B01J 8/1872 |
| 2021/0214472 A1* | 7/2021 | Baita | B01J 19/2435 |
| 2021/0332167 A1* | 10/2021 | Penzo | C07C 7/12 |
| 2022/0098332 A1* | 3/2022 | Savatsky | C08F 110/02 |
| 2022/0119563 A1* | 4/2022 | Savatsky | C08F 210/08 |

\* cited by examiner

OPTIMIZED INERT GAS PARTIAL PRESSURE IN A GAS PHASE POLYMERIZATION PROCESS

CROSS-REFERENCE TO RELATED APPLICATION

This application claims the benefit of U.S. Provisional Application 63/071,304, filed Aug. 27, 2020 entitled "Optimized Inert Gas Partial Pressure In A Gas Phase Polymerization Process", the entirety of which is incorporated by reference herein.

BACKGROUND

This section is intended to provide relevant background information to facilitate a better understanding of the various aspects of the described embodiments. Accordingly, it should be understood that these statements are to be read in this light and not as admissions of prior art.

Embodiments provided herein generally relate to methods for making polyolefin polymers such as polyethylene polymers. More particularly, embodiments provided herein relate to methods for making polyethylene polymers that are optimized to reduce losses of unreacted monomers and induced condensing agents in a loop reactor system.

Polyolefins may be produced using gas phase polymerization processes. If the process is a gas-phase fluidized bed polymerization process, the process may include a gas stream including one or more monomers continuously passed through a fluidized bed of catalyst and growing polymer particles. As polymerization occurs, a portion of the monomers are consumed and the gas stream is heated in the reactor by the heat of polymerization. A portion of the gas stream exits the reactor and may be recycled back to the reactor as a recycle stream through a loop configuration with additional monomers and additives.

Loop configurations are used for gas phase polymerization reactor systems to increase productivity. About 3% of the monomer in an input stream is converted into product polymer in a single pass of a feed stream through a reactor. However, the desired monomer conversion is at least 99%. Therefore, the reactor system includes a loop back of a recycle stream to recycle monomer. To form the recycle stream, gas leaves through the top of the reactor and passes through a compressor and then a cooler. The compressor acts as a blower that blows the gas through cooler. The polymerization reaction is an exothermic reaction, that is it releases heat, and the cooler is a heat exchanger that removes heat from the recycle stream through heat transfer. As unreacted monomer loops through the reactor system before reacting, its temperature rises in the reactor and falls in the cooler.

The loop reactor system may operate in a "condensed mode" or "condensing mode". In condensed mode operation, the recycle stream is cooled to a temperature below the dew point of the recycle stream, resulting in condensing a portion of the recycle stream and an increase in polymer production. The resulting stream containing entrained liquid is then returned to the reactor. The input stream of a loop reactor system operated in condensed mode may include one or more condensing agents, also termed induced condensing agents. The induced condensing agents assist the condensation of the recycle stream in the cooler. The cooling of the unreacted monomer may be three times as effective in the presence of induced condensing agents.

The total reactor pressure is customarily maintained at a minimum total reactor pressure in order to limit carry-over of product polymer with the recycle stream from the reactor into the compressor, which is undesirable. Product polymer is in the form of solid granules, similar in size to sand. If product polymer enters the compressor, the product polymer can melt and can plug up the cooler. Product polymer can also damage the compressor by damaging the spinning impellor blades. Further, the interaction of granules with the impellor blades can transfer energy to the granules, which is absorbed as heat that causes the granules to melt and stick to the compressor or in the cooler, causing fouling. Another aspect of higher total reactor pressure is that the compressor's energy usage is proportional to the total pressure of the reactor. The impellor blades are spinning through a fluid and the resistance of the fluid from the mass through which the blades move is proportional to the total reactor pressure. The energy usage in turn is proportional to the resistance. Therefore, the total pressure customarily is maintained at the minimum pressure to provide fluidization, to avoid product polymer carry-over, and to minimize the compressor's energy usage.

The reactor system further includes a venting system for adjusting the partial pressure of an inert gas as an output gas in the recycle stream to control the total reactor pressure. The inert gas is typically nitrogen. While the partial pressures of the monomer and induced condensing agent in the reactor are controlled by adjusting the flow rates of monomer and induced condensing agent in the input stream, the inert gas is allowed to "float", with the partial pressure of the inert gas adjusted through venting.

The venting system may include a separation device for separating the inert gas from unreacted monomer and induced condensing agent. "Break-through" occurs when too much gas is going through the separation device, exceeding its capacity. In this situation, direct venting occurs. In direct venting, the gas exiting the reactor may be flared, causing undesirable waste of monomer and induced condensing agent. The effectiveness of the removal of the inert gas depends on the inert gas partial pressure and increases with increasing inert gas partial pressure. However, operating at the minimum pressure tends to limit the efficiency of inert gas removal and thus the reduction of hydrocarbon losses.

The following references are of potential interest in this regard: U.S. Pat. Nos. 4,003,712, 4,011,382, 4,086,408, 4,303,771, 4,349,648, 5,352,749, 6,063,877, 9,328,177, U.S. Patent Application Publication No. 2005/0137364A1, and PCT Patent Application Publication Nos. 2014/074981 and 2018/063765.

BRIEF DESCRIPTION OF THE DRAWINGS

Embodiments of the processes are described with reference to the following figure. The same numbers are used throughout the figure to reference like features and components. The features depicted in the figure are not necessarily shown to scale. Certain features of the embodiments may be shown exaggerated in scale or in somewhat schematic form, and some details of elements may not be shown in the interest of clarity and conciseness.

SUMMARY

One or more embodiments of the disclosed gas phase polymerization process include contacting an input stream comprising a monomer and an induced condensing agent in the presence of an inert gas with a catalyst in a fluidized bed reactor to produce a polymer, unreacted monomer, and an output gas; recycling a recycle stream of the unreacted monomer from the reactor to the input stream; venting at least a portion of the output gas from the reactor; and maintaining a partial pressure of the inert gas in the reactor above a reference inert gas pressure to decrease losses of the recycle stream with the vented output gas.

One or more embodiments of the disclosed gas phase polyethylene polymerization process include contacting an input stream comprising ethylene and an induced condensing agent in the presence of nitrogen with a Ziegler-Natta, metallocene, or chromium catalyst in a reactor to form polyethylene or a polyethylene copolymer, unreacted ethylene, and an output gas; recycling a recycle stream of the unreacted ethylene from the reactor to the input stream; venting at least a portion of the output gas from the reactor; and maintaining a partial pressure of the nitrogen in the reactor above a reference nitrogen partial pressure to decrease losses of the recycle stream with the vented output gas.

One or more embodiments of the disclosed gas phase polyolefin polymerization process include contacting an input stream comprising an olefin monomer and an induced condensing agent in the presence of nitrogen with a Ziegler-Natta, metallocene, or chromium catalyst in a reactor to form a polyolefin, unreacted olefin, and output gas; recycling a recycle stream of the unreacted olefin monomer from the reactor to the input stream; venting at least a portion of the output gas from the reactor; maintaining a partial pressure of the nitrogen in the reactor above a reference inert gas pressure to decrease losses of the recycle stream with the vented output gas; and maintaining a total reactor pressure above a reference total reactor pressure, while maintaining a partial pressure of the olefin monomer in the reactor at a reference olefin monomer pressure and maintaining a partial pressure of the induced condensing agent in the reactor at a reference induced condensing agent pressure.

DETAILED DESCRIPTION

The present inventors have discovered that, surprisingly in contrast to customary operation, a method of controlling the inert gas partial pressure may include varying the total reactor pressure up to the maximum safe pressure, without causing carry-over of product polymer. This can be done by increasing the inert gas partial pressure independently of other operating parameters, such as monomer partial pressure and induced condensing agent partial pressure. The increased inert gas partial pressure increases the efficiency of removal of the inert gas in the output gas of the recycle stream, thus decreasing losses of unreacted monomers and induced condensing agents from the recycle stream.

Definitions

The term "ICA" refers to an induced condensing agent. "ICAs" refers to induced condensing agents. "ICA composition" refers to the total induced condensing agent in the reactor and encompasses compositions with two or more induced condensing agents. ICAs suitable for use in methods of the present disclosure may include C3-C6 hydrocarbons or combinations thereof. For example, ICAs suitable for use may include n-butane, isobutane, n-pentane, isopentane, neo-pentane, hexane, isohexane, and other hydrocarbon compounds that are similarly non-reactive in the polymerization process. A "binary ICA composition" is an ICA composition that includes two ICAs, and a "ternary ICA composition" is a ICA composition that includes three ICAs.

The terms "iC4" and "isobutane" refer to 2-methylpropane.

The terms "nC4" and "n-butane" refer to normal-butane.

The terms "iC5" and "isopentane" refer to 2-methylbutane.

The terms "nC5" and "n-pentane" refer to normal-pentane.

The terms "neoC5" and "neo-pentane" refer to 2,2-dimethylpropane.

The terms "nC6" and "n-hexane" refer to normal-hexane.

The term "C6 inerts" refers to various hexane isomers that are inert to reaction conditions and may include nC6, 2-methylpentane, 3-methylpentane, 2,2-dimethyl butane, 2,3-dimethylbutane, 2-hexene, and/or 3-hexene.

The term "polyethylene" denotes a polymer of ethylene and optionally one or more C3-C18 alpha-olefins, while the term "polyolefin" denotes a polymer of one or more C2-C18 alpha-olefins and optionally one or more comonomers. An "olefin" is an unsaturated hydrocarbon that contains at least one carbon-carbon double bond. An alpha-olefin is a hydrocarbon that contains at least one carbon-carbon double bond at one end of a carbon chain (e.g. 1-butene, vinyl-cyclohexane). For the purposes of this disclosure, ethylene shall be considered an α-olefin.

Polymerization Reactor

The methods described may be used in pilot plant or commercial size reactors including a variety of designs. For example, the methods can be used in commercial-scale reactions, such as gas-phase fluidized-bed polymerization reactions, that can be monitored and optionally also controlled. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor in a recycle stream. Polymer product is withdrawn from the reactor and fresh monomer is added in an input stream to replace the polymerized monomer.

Figure 1:
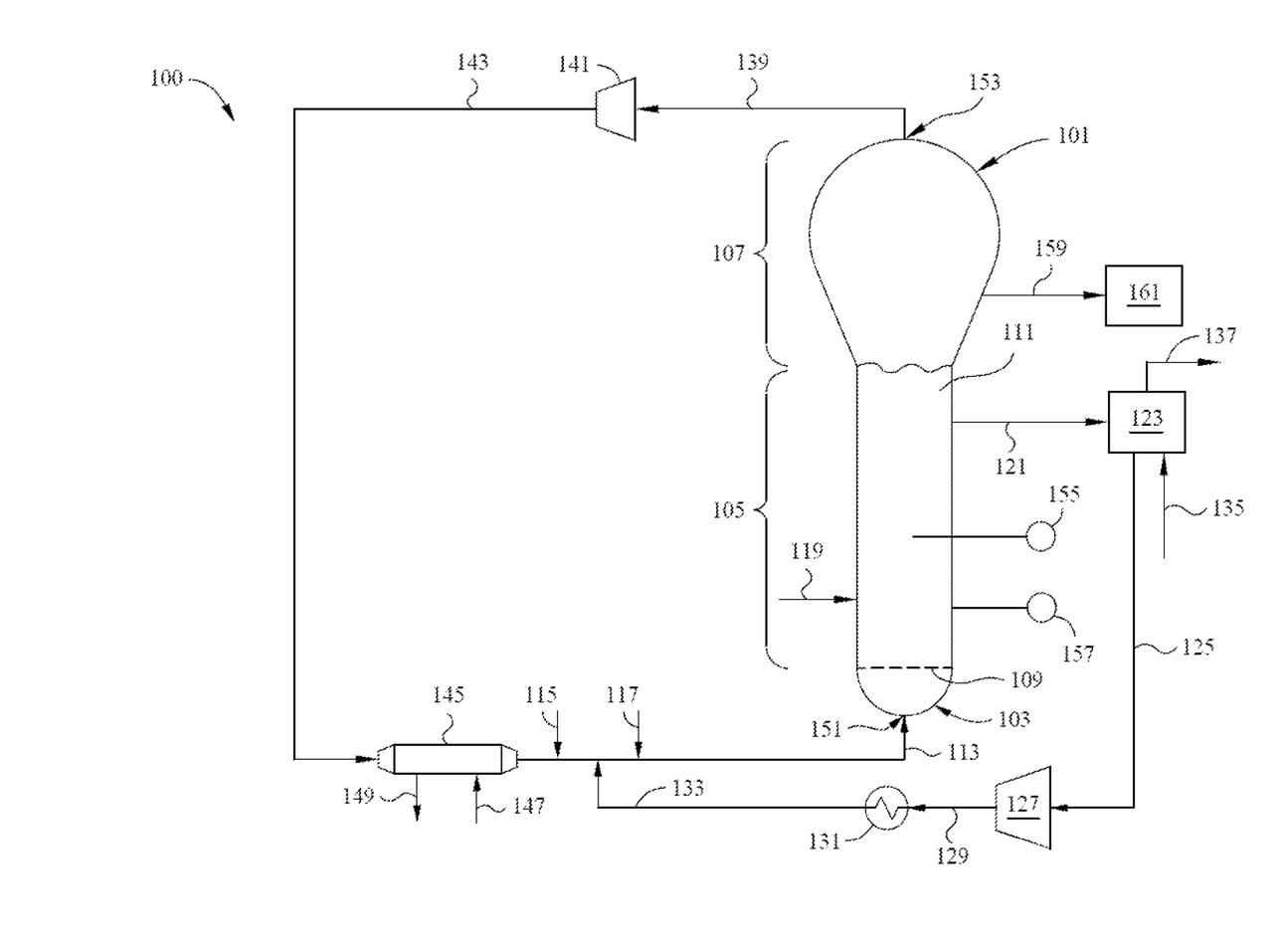
FIG. 1 is a schematic diagram of a gas phase polymerization system employing the process, according to one or more embodiments.

FIG. 1 is a schematic diagram of a polymerization system 100 that can be monitored and controlled in accordance with embodiments described. The polymerization system 100 includes a fluidized bed reactor 101 having a bottom end 103, a straight section 105, a top expanded section 107, and a distributor plate 109 within the straight section 105. A fluidized bed 111 of granular polymer (once formed) and catalyst particles is contained within the straight section 105, and may optionally extend slightly into the top expanded section 107. The bed is fluidized by the steady flow of recycle gas through the distributor plate 109. The recycle gas enters the fluidized bed reactor 101 through line 113, additional reactants and inert gases (including CAs) may be added in adjustable ratios through line 115. Aluminum alkyl (optional) may be added through line 117. The flow rate of the recycle gas is regulated to maintain circulation of fluidized bed 111. For examples, a recycle gas velocity of from about 1 ft/sec to about 3 ft/sec, such as from about 2 ft/sec to about 3 ft/sec, or from about 2.4 ft/sec to about 2.8 ft/sec is used to maintain a fluidized bed 111 in the reactor 101 while operating the reactor 101 at a total reactor pressure of about 4200 kPa or less, about 700 kPa to about 4200 kPa, about 1300 kPa to about 2800 kPa, or about 1700 kPa to about 2500 kPa.

The polymerization system 100 has one or more catalyst lines 119 for controlling the addition of polymerization catalyst to a reaction zone (not shown) within fluidized bed 111, and generally within straight section 105. Within the reaction zone, the catalyst particles react with reaction gases including an olefin monomer (e.g., ethylene) and optionally a comonomer and other reaction gases (e.g., hydrogen) to produce the granular polymer particles. As new polymer particles are produced, other polymer particles are continually withdrawn from the fluidized bed 111 through a product discharge line 121 to product recovery system 123. The fluidized bed 111 may be maintained at a constant height by withdrawing a portion of the fluidized bed 111 at a rate equal to the rate of formation of particulate polymer product. The product may be removed continuously or nearly continuously via a series of valves (not shown) into a fixed volume chamber (not shown), which is simultaneously vented back to the reactor. The fixed volume chamber and venting back to the reactor allows for highly efficient removal of the product, while recycling a large portion of the unreacted gases back to the reactor.

Unreacted olefins and ICA composition within the product recovery system may be removed via line 125, compressed in compressor 127, and travel via line 129 to heat exchanger 131 to be cooled before being recycled (e.g., via line 133) to line 113. The particles within product recovery system 123 may be degassed (or "purged") with a flow of inert gas such as nitrogen through line 135 to remove substantially all of the dissolved hydrocarbon materials. In some instances, the polymer granules may be treated with a small stream of humidified nitrogen to deactivate trace quantities of residual catalyst. The purge gas may be removed via line 137 to be vented to flare or recycled with further processing.

The polymerization system 100 also has a cooling recycle loop which includes a first recycle gas line 139, compressor 141, a second recycle gas line 143, and cooling system 145 (such as a circulating gas cooler), coupled with the fluidized bed reactor 101. Cooling system 145 may accept cooling water via line 147 and expel heated water via line 149. Cooling of the recycle gas is a method used to cool polymerization system 100 to reduce or eliminate issues that may arise from exothermic polyolefin production. During operation, the cooled circulating gas from cooling system 145 flows via line 113 through inlet 151 into the fluidized bed reactor 101, then propagates upward through fluidized bed 111 and out from the fluidized bed reactor 102 via outlet 153.

The top expanded section 107 may also be known as a "velocity reduction zone," and is designed to reduce the quantities of particle entrainment in the recycle gas line from the fluidized bed. The diameter of the top expanded section 107 generally increases with the distance from straight section 105. The increased diameter causes a reduction in the speed of the gas stream, which allows most of the entrained particles to settle back into the fluidized bed 111, thereby minimizing the quantities of solid particles that are "carried over" from the fluidized bed 111 through the recycle gas line 139. In some instances, a screen (not shown) may be included upstream of the compressor 141 to remove larger material.

To maintain a reactor temperature, the temperature of the recycle gas may be continuously adjusted up or down to accommodate changes in the rate of heat generation due to the polymerization. One or more temperature sensors 155 may be located in the fluidized bed, and used with a control system and the cooling loop to control the temperature of the fluidized bed 111 near the process set-point. Heated reactor gas, which carries heat energy from the fluidized bed reactor 101, is withdrawn from the outlet 153 and is pumped by the compressor 141 via line 143 to cooling system 145 where the temperature of the heated reactor gas is reduced and at least a portion of the ICA composition present is condensed to a liquid. The recycle gas from the cooling system 145, including condensed liquids, flows via line 113 to the reactor inlet 151 to cool the fluidized bed 111. Temperature sensors (not shown) near the inlet and outlet of the cooling system 145 may provide feedback to a control system (not shown) to regulate the amount by which cooling system 145 reduces the temperature of the recycle gas entering the fluidized bed reactor 101.

The fluidized bed reactor 101 may also include skin temperature sensors 157, mounted in positions along a wall of the straight section 105 of the fluidized bed reactor 101 so as to protrude into the bed from the reactor wall by a small amount (e.g., about one eighth to one quarter of an inch). The skin temperature sensors 157 may be configured and positioned to sense the temperature of the resin near the wall of the fluidized bed reactor 101 during operation.

The temperature sensors 155 in the fluidized bed 111 can include a resistance temperature sensor positioned and configured to sense bed temperature during reactor operation at a location within the fluidized bed reactor 101 away from the reactor wall. The resistance temperature sensor can be mounted so as to protrude into the bed more deeply than the skin temperature sensors 157 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties may be measured by periodically sampling the resin when exiting the reactor (e.g., about once per hour), and performing the appropriate tests in a quality control laboratory.

Other measured reaction parameters may include reactor gas composition (e.g., concentrations and partial pressures of reactant gases, ICA, and other inert gases, such as nitrogen, inert hydrocarbon, and the like). The reactor gas composition may be measured by removal of gas from upper portion 107 via line 159 to a gas chromatograph ("GC") system 161. GC system 161 may also be connected by lines (not shown) other than line 159 to other parts of polymerization system 100, such as recycle gas line 139, compressor 141, line 143 or any combination thereof.

The process control variables may be controlled to obtain the desired productivity for the polymerization system 100 and properties for the resin. For example, the parameters used to control gas phase composition within the fluidized bed reactor 101 can include the concentration (partial pressure) and composition of the ICA composition and comonomer, the partial pressure of monomer, the type and properties of catalysts, and the temperature of the reaction process. In the methods described, stickiness of the resin during the reaction may be controlled by a control system adjusting (or regulating) the temperature and/or the composition and concentration of the ICA composition used in the reaction.

The gas phase reactor system may include a controller in communication with the venting system for controlling the concentration of the inert gas in the reactor by venting output gas, which includes inert gas, from the polymer reaction. For example, the inert gas may be nitrogen. The inert gas has multiple functions, for example fluidizing the catalyst bed and controlling the total pressure of the reactor. The inert gas partial pressure does not change the reaction kinetics, which depend on the monomer and condensing agent partial pressures. To lower the total pressure of the reactor, the inert gas of the output gas is removed through venting, thus lowering the inert gas partial pressure. To raise the total reactor pressure, venting is reduced or stopped and the partial pressure of the inert gas is allowed to build up. The total pressure and partial pressures are measured with measuring devices that are in communication with the controller. For example, the total pressure is measured with a total pressure gauge and the partial pressures are measured, through measuring the concentration of each component, in mole %, with a gas chromatograph. The partial pressure of a component is the concentration in mole % of the component multiplied by the total pressure.

Polyolefin Production

Polyolefin polymerization may be performed in a reactor by contacting an olefin monomer (optionally with a comonomer) with one or more catalysts (supported or not) in the presence of an optional ICA composition and an inert gas, e.g. hydrogen. The individual flow rates of olefin monomer, optional comonomer, hydrogen, and optional ICA composition (or individual components thereof) may be controlled to maintain fixed gas composition targets. The concentration of all gases may be measured with a chromatograph. A solid catalyst, a catalyst slurry, or liquid solution of the catalyst(s) may be injected directly into the reactor using a carrier gas (e.g., purified nitrogen), where the feed rate of catalyst(s) may be adjusted to change or maintain the catalyst inventory in the reactor.

In one or more embodiments, the polymerization reaction may be performed at a total reactor pressure of about 4200 kPa or less, about 700 kPa to about 4200 kPa, about 1300 kPa to about 2800 kPa, or about 1700 kPa to about 2500 kPa.

Generally, the olefin monomer concentration is controlled and monitored by the olefin monomer partial pressure. In one or more embodiments, the olefin partial pressure may be at about 4200 kPa or less, such as about 500 kPa to about 2000 kPa, about 1000 kPa to about 1800 kPa, about 1200 kPa to about 1700 kPa, or about 1400 kPa to about 1600 kPa.

The comonomer concentration may be controlled and monitored by a comonomer to olefin monomer mole ratio (or alternatively, the flow rates of comonomer and olefin monomer are held at a fixed ratio). When present, the comonomer may be at a relative concentration to the olefin monomer that will achieve the desired weight percent incorporation of the comonomer into the finished polyolefin. In one or more embodiments, the comonomer may be present with the olefin monomer in a mole ratio in the gas phase of from about 0.0001 to about 50 (comonomer to olefin monomer), from about 0.0001 to about 5, from about 0.0005 to about 1.0, or from about 0.001 to about 0.5.

The olefin monomer or comonomers, for example, may be a C2-C18 alpha-olefin. In one or more embodiments, the olefin monomer is ethylene, and a comonomer is a C3-C12 alpha olefin. In one or more embodiments, the olefin monomer may be ethylene or propylene, and a comonomer may include C4-C10 alpha-olefins. For example C2-C18 alpha-olefins that may be utilized as a comonomer in embodiments described may include: ethylene, propylene, 1-butene, 1-pentene, 1-hexene, 1-heptene, 1-octene, 4-methylpent-1-ene, 1-decene, 1-dodecene, 1-hexadecene, and the like, and a combination thereof. Additionally, a polyene may be used as a comonomer according to one or more embodiments described. For example, polyenes may include: 1,3-hexadiene, 1,4-hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-vinylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described.

Examples of polymers that can be produced in accordance with the method described may include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more C2-C18 alpha olefin; and terpolymers of one or more C2-C18 alpha olefins with a diene. In some embodiments, the polyolefin produced by the method described may include olefin homopolymers (e.g., homopolymers of ethylene or propylene). In some instances, the polyolefin produced may be copolymers, terpolymers, and the like of the olefin monomer and the comonomer.

In one or more embodiments, the polyolefin produced may be a polyethylene or a polypropylene. Exemplary polyethylenes produced by the methods described may be homopolymers of ethylene or copolymers of ethylene (or terpolymers of ethylene) having at least one alpha-olefin (comonomer) where the ethylene content may be at least about 50% by weight of the total monomers involved. Exemplary polypropylenes produced by the methods described may be homopolymers of propylene or interpolymers of propylene and at least one alpha-olefin (comonomer) where the propylene content may be at least about 50% by weight of the total monomers involved.

Hydrogen gas is often used in olefin polymerization to control the final properties of the polyolefin. For some types of catalyst systems, increasing concentrations (or partial pressures) of hydrogen may alter the molecular weight or melt index of the polyolefin generated. The melt index can thus be influenced by the hydrogen concentration. Generally, the amount of hydrogen in the polymerization is expressed as a mole ratio relative to the total polymerizable monomer (e.g., relative to ethylene or relative to a blend of ethylene and hexene or propylene). The amount of hydrogen used in some polymerization processes is an amount necessary to achieve the desired melt index (or molecular weight) of the final polyolefin resin. In some embodiments, the mole ratio in the gas phase of hydrogen to total polymerizable monomer ($H_2$ to monomer) may be about 0.00001 or greater, about 0.0005 or greater, about 0.001 or greater, about 10 or less, about 5 or less, about 3 or less, or about 0.10 or less, where a range may include a combination of a upper mole ratio with a lower mole ratio described.

Catalyst

Exemplary catalysts suitable for use in the embodiments described may include: Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

Ziegler Natta catalysts, metallocene catalysts, chromium based catalysts, and vanadium based catalysts are known. The product polymer depends on the catalyst. It will understood that it is within the skill of one of ordinary skill in the art to select from known catalysts according to the identity of the product polymer.

In one or more embodiments, the present disclosure provides a catalyst system comprising a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3 or +4.

The structure of a metallocene catalyst compound may take on many forms, such as those disclosed in, for example, U.S. Pat. Nos. 5,026,798, 5,703,187, 5,747,406, and 6,476,171, including a dimer or oligomeric structure, such as disclosed in, for example, U.S. Pat. Nos. 5,026,798 and 6,069,213. Others include those catalysts described in U.S. Patent Application Publication Nos. US2005/0124487A1, US2005/0164875A1, and US2005/0148744. In some embodiments, the metallocene may be formed with a hafnium metal atom (e.g., bis(n-propylcyclopentadienyl) hafnium Xn, bis(n-butylcyclopentadienyl) hafnium Xn, or bis (n-pentylcyclopentadienyl) hafnium Xn, where X is one of chloride or fluoride and n is 2), such as is described in U.S. Pat. Nos. 6,242,545 and 7,157,531.

A catalyst compound of the present disclosure can be a chromium or chromium-based catalyst. Chromium-based catalysts include chromium oxide ($CrO_3$) and silylchromate catalysts. Chromium catalysts have been the subject of much development in the area of continuous fluidized-bed gas-phase polymerization for the production of polyethylene polymers. Such catalysts and polymerization processes have been described, for example, in U.S. Patent Application Publication No. 2011/0010938 and U.S. Pat. Nos. 7,915,357, 8,129,484, 7,202,313, 6,833,417, 6,841,630, 6,989,344, 7,504,463, 7,563,851, 8,420,754, and 8,101,691.

Inert Gas

There are various methods to add the inert gas to the reactor. One method to add inert to the reactor is inert-fluidized catalyst addition. In inert-fluidized catalyst addition, the inert gas enters the reactor as a gas fluidizing the catalyst.

Another method to add the inert gas to the reactor is dissolved-inert feed addition. The inert gas is able to dissolve in the liquids that are recovered through the vapor recovery system, e.g. a flare gas recovery systems, that recover monomers or diluents like iC5, C6, the cooling agents or co-monomer that are returned to the reactor. Most of the materials either contact the inert gas at some point or they are in a vessel that has an inert gas blanket or they have been able to accumulate the inert gas. Typically the most dissolved inert gas comes from fresh liquids or recycled liquids, for example iC5 and C6. Liquids are better at holding the inert gas in them. Ethylene as a gas could mix with the inert gas, but ethylene does not have much opportunity to interact with the inert gas. Ethylene is not blanketed because it is a gas itself. It will be understood to one of ordinary skill in the art that determining the amount of dissolved inert gas can make use of the known principle of Henry's Law, describing dissolution of gas in a liquid.

Yet another method to add the inert gas to the reactor is discharge-mediated inert gas addition where the product discharge system is a two-way system. Gas and solids are removed from the reactor and gas that is outside the reactor is put back into the reactor. The convey gas is an inert rich gas that goes into the second set of vessels in the product discharge system. There are two vessels at the top of the product discharge system and two at the bottom. Product polymer falls from the top two vessels to the bottom two vessels due to gravity. Purging equipment is downstream from the product discharge system. Some hydrocarbons will still escape through with the product stream that exits the reactor and the purging equipment dries the product of these escaped hydrocarbons. After the product discharge system, the product polymer passes to the purge column for de-volatilization, which removes the dissolved hydrocarbons leaving dried product polymer. In the purge column, which can be a stripping column, a liquid phase is pulled out of a solid phase. The purge dries the product polymer. The drying allows safe transport of the product polymer, for example in a rail car. To pass from the product discharge system to a purge column, the product polymer is propelled from the bottom of the product discharge system up to reach the top of the purge column using the convey gas. The convey gas is injected into the bottom vessels of the product discharge system. The convey gas goes out above the product discharge system and then into the reactor through a back flow. With respect to the back flow, any airlock will transfer material in one of two ways, unless a vacuum is used. A lock hopper is a vessel that has a valve above and below it that acts like an airlock for process equipment. In a lock hopper two-way flow occurs.

Yet another method to add inert gas to the reactor is direct addition. In direct addition, a pipe adds high-pressure inert gas directly to the reactor. However, if the inert gas is directly injected into the reactor it needs to be removed. The need for removal may cause hydrocarbon waste so if the capacity of the vent column separating the inert gas and hydrocarbons is reached any additional inert gas will need to be directly vented.

There are also various methods to remove inert gas from the reactor through venting. Venting may proceed through a vent column that is a stripping column. In the vent column gas molecules (e.g. inert gas) are pulled out of other gas molecules (e.g. unreacted monomers and condensing agents.) Unreacted monomer and induced condensing agent, collectively "hydrocarbons", in gas form can also exit the reactor with the inert gas. The vent column separates unreacted monomer and induced condensing agent from inert gas. The vent column contains an up-going stream that can contain gas from the reactor and a down-going stream containing a stripping liquid. Unreacted monomer and induced condensing agents dissolve in the stripping liquid, separating them from the inert gas, which remains in the up-going stream. Thus, the venting may include stripping unreacted monomer from at least a portion of an output gas in a stripping column. Another method of venting is direct venting. Yet another method of venting is removal of inert gas via the product discharge system. Thus, the venting may include passing the produced polymer, at least a portion of the unreacted monomer, at least a portion of the induced condensing agent, and at least a portion of an output gas to a product discharge system. Therefore, three different options for removing the inert gas are a vent column, direct venting, and via the product discharge system. They may be used singly or in combination. The vent column and direct venting are optional. Thus, the venting may exclude stripping the unreacted monomer from an output gas in a stripping column. Thus, the venting may exclude directly venting an output gas from the reactor.

Raw Material Intensity

Raw material intensity is the amount of hydrocarbons (e.g. kg) that end up in the direct vent per amount (e.g. tonne) of product polymer and is used to illustrate losses of a recycle stream through venting of output gas. The hydrocarbon losses include unreacted monomers and any induced condensing agents. Raw material intensity is also a measure of efficiency of nitrogen or other output gas removal from the reactor recycle stream. That is, increasing the efficiency of removal of output gas and decreasing hydrocarbon losses can be quantified by the same measurement of raw material intensity. Raw material intensity is used in Example 1 discussed below.

When producing polyethylene (PE) in a Gas-phase Polyethylene (GPPE) reactor, some unreacted monomer or inerts ("desired" chemicals) will be removed from the reactor with the PE. The post-reaction systems are designed to collect these "desired" chemicals and separate them into a nitrogen-rich portion (sent to flare or other emissions control system) and a hydrocarbon rich portion (induced condensing agents, unreacted monomer—"desired" chemicals) to be returned to the reactor through the recycle stream. The nitrogen rich portion will contain some "desired" chemicals too—these will be destroyed in the emissions control system (such as a flare or thermal oxidizer). The sum of the destroyed "desired" chemicals divided over a given time period divided by the total PE produced in the same time period is defined as raw material intensity. This is typically reported as kg/tonne or lb/klb. For example, a typical GPPE raw material intensity will be between 20 lb/klb and 5 lb/klb. A lower raw material intensity is typically better.

The composition of the nitrogen rich portion and its flow rate are measured by the combination of a flow meter to the emissions control system (for flow), e.g. a DigitalFlow™ GF868 Ultrasonic Flowmeter for Flare Gas from GE, and a composition determining instrument or analyzer (typically a gas chromatograph, e.g. SIEMENS MAXUM). The total amount of polyethylene (PE) produced is determined by a custody transfer instrument, such as scales on the outgoing packaged PE, e.g. Revere CP load cell. The outgoing packaged PE may be on a rail car. When the rail car leaves a plant it is placed on a scale. The scale includes a spring that is compressed by the weight of the rail car. By knowing the unladen weight of the rail car and the rate of the rail cars, an amount of PE in lbs/hr is determined.

Alternately to instrumentation on the emission control system such as flow meter and gas chromatograph, a material balance is used. Anything fed to the reactor that is not made into PE will end up in the emissions control system and destroyed. It will be understood by one of ordinary skill in the art that there are known methods to formulate the material balance in mathematical equations that depend on the equipment and flow indications of a given site. It will be understood that not every site has the same equipment or flow indicators. Therefore, the specific equations vary with site. However, it will be understood that any material balance can be solved as long as flow measurements are taken. For example, monomers, such as ethylene and hexane, and hydrogen are each fed to the reactor at a given rate that can be measured with a Rosemount flowmeter. Induced condensing agents when added are also measured. These "desired" chemicals are then fed into the reactor. On one side of the material balance is these "desired" chemicals. On the other side is products and waste. The equations are solved for the waste. That is divided over a time period to solve for the waste generated.

Alternately to a custody transfer instrument, the total amount of PE is measured with a detailed energy balance as the PE is produced or extruded (PE granules melted and reformed into pellets). An example for total PE would be to use a temperature measurement into the reactor cooler, e.g. with a Rosemount™ 3144P temperature transmitter and a temperature measurement out of the reactor cooler, e.g. with a Rosemount™ 3144P temperature transmitter, and a flow measurement for the water cooling the reactor, e.g. with a Rosemount™ 3051SFP Integral Orifice Flow Meter, to determine the total number of BTUs removed. The flowmeter puts a restriction in the water line that causes a pressure drop. Measurement before and after the restriction gives a flow rate. It is more convenient to measure the water flow than reactor gases. All the PE goes through a single heat exchanger. Cooling water comes in and leaves hotter. The cooling water experiences no change of state. Inside the reactor there are phase changes so the energy balance would be more complicated using components inside the reactor. The cooling water in and the cooling water out are measured, giving a temperature change. From knowing how much water the BTU can be obtained. The temperature change in BTU/lb is multiplied by the flow of water in lbs/hr to obtain BTU/hr. By using the heat of reaction of PE, e.g. the Gibbs free energy for the bond changes, the PE produced is determined from the measurements. Methods for determining heat of reaction for PE are known to one of ordinary skill in the art. The BTU/hr is divided by the heat of reaction to obtain lbs/hr of PE.

Reference Operation

The reference inert gas pressure for the reactor process, e.g., reference nitrogen pressure, is set by customary operating directive. The operating directive specifies the total reactor pressure and the minimum allowable inert gas concentration. Below that minimum, the inert gas is added to the reactor directly. Operating directives may also set reference monomer pressure as well as reference induced condensing agent pressure as components of the reference total reactor pressure. On the other hand, if the total reactor pressure is above the specified value for total reactor pressure as determined by operating directive, inert gas is vented to reduce total pressure. A typical customary operating directive for total reactor pressure is 21 bar absolute and a typical minimum inert gas, e.g. nitrogen, concentration is 10 mole %. Example 2 illustrates typical customary operating directives.

The reference total reactor pressure is the minimum total reactor pressure at which the reactor can operate within its operating directives. The operating directives include product identity, raw material intensity, and catalyst productivity. In customary operation, an algorithm is used to determine the reference partial pressures from the operating directions. That is, the reference total reactor pressure associated with customary operation is a dependent variable.

A unique aspect of the present technology is to decouple the inert gas partial pressure from dependency on the operating directives. That is, the increased inert gas partial pressure of the present technology is an independent variable and may be maximized. Further, this present method may include independently determining the total reactor pressure, in particular independently of the operating directives for reference monomer pressure and reference induced condensing agent pressure, which may be maintained despite adjusting the inert gas partial pressure and total reactor pressure.

Optimized Inert Gas Partial Pressure

The present method of polymerization involves increasing efficiency of removal of the inert gas of the output gas in the recycle stream to decrease losses of hydrocarbons. The method further involves improving the system and the reactor operation by optimizing the inert gas partial pressure. For example, the method may involve increasing and maintaining total reactor pressure above a reference total reactor pressure by adjusting the inert gas partial pressure. In doing so, the partial pressure of the monomer in the reactor may be maintained at a reference monomer pressure and a partial pressure of the induced condensing agent in the reactor may be maintained at a reference induced condensing agent pressure. The method may further involve maintaining monomer and induced condensing agent concentrations at their same partial pressures and only increasing an inert gas partial pressure, where the inert gas may comprise nitrogen, to effect this total reactor pressure change. The method may involve the ultimate result that the type of product polymer made does not change, the reliability of the system does not change and the raw material usage does decrease.

The present methods involve maximizing the inert gas partial pressure to increase the efficiency of removal of the inert gas as output gas from the reactor. For a 5% increased efficiency of output gas removal, the reduction in hydrocarbon loss may be about a 5%. However, the relationship is not directly proportional. The relationship is similar to a 1/x decay. The venting is inversely proportional to the inert gas concentration. Thus, as the nitrogen concentration goes down, the venting goes exponentially higher.

An advantage of the present method is that fewer hydrocarbons are released with the reactor waste, for example by flaring, while the same polymer may be made, with the same reliability as in customary operation.

When the reduction in loss is measured with raw material intensity, described below, by increasing the inert gas removal efficiency, it is possible with the present technology to reduce the raw material intensity by as much as 1 kg hydrocarbons in direct vent per tonne of polymer product (kg/tonne), for example by as much as 2 kg/tonne, for example by as much as 3 kg/tonne (noting a tonne is 1000 kg). Both the increased efficiency and decreased loss can be expressed by the raw material intensity. Reduction in raw material intensity is illustrated in Example 3. Reduction in raw material intensity can result in reduction of variable operating cost, which is a measure of operations known for polyethylene polymerization and can include for example raw materials and utilities.

The present inventors have been able to titrate a decrease in raw material intensity without undesired outcomes such as carry-over occurring by optimizing an increase in inert gas partial pressure. The increase in inert gas partial pressure results in an increase in total reactor pressure beyond reference operating directive values such as reference total reactor pressure, without altering other reactor conditions, particularly partial pressures of monomers and other hydrocarbons such as induced condensing agents. The lack of undesired outcomes was unexpected in light of industry norms, whereby it is conventionally expected that increased pressure above the minimum needed for reactor operation would result in undesired outcomes. These industry norms informed customary operation. In the customary operation, the inert gas partial pressure is determined by the operating directives, which include raw material intensity. That is, in customary operation, the inert gas partial pressure is a dependent variable.

In the present method, the inert gas partial pressure varies independently of the operating directives. In particular, the inert gas partial pressure can vary up to an amount such that the total pressure of the reactor vessel is equal to the maximum safe pressure of said reactor vessel. The maximum safe pressure is defined by a trigger pressure for a reactor safety system. The method may involve increasing the total reactor pressure up to a maximum safe pressure. The maximum safe pressure may be set by the allowable limits of the reactor as defined by the point at which a safety system is about to be triggered. The safety system may include a relief device that includes a first to fail valve or a rupture disc. When the relief device triggers, the total reactor pressure is reduced by the action of the relief device. The settings of the safety system are adjusted according to the rating of the reactor. The rating of the reactor vessel defines a rated pressure that is below the breaking point of the reactor. For example the rated pressure may be 25% below the breaking pressure. The trigger pressure of the relief device, also termed cracking pressure, may be set at a value relative to the rated pressure, for example from 10% of the rated pressure to the rated pressure, for example from 10% below the rated pressure to the rated pressure. A unique aspect of the implementation the current technology is the use of more metal in the reactor to increase the rating, thus the rated pressure. The maximum safe pressure may be less than or up to the rated pressure.

EXAMPLES

Example 1. Pressure Increase Simulation Study

This example illustrates maintaining the partial pressure of the inert gas in the reactor above a reference inert gas pressure to decrease losses of the recycle stream.

Two different reactors, each typically run at 290 PSIG total pressure, were modelled as running up to 320 PSIG. Results are shown in the table. The table gives the change in total pressure, as controlled by (and the same as the change in) nitrogen partial pressure. Reactor 1 and Reactor 2 conditions differed in their reference nitrogen partial pressures. The reference nitrogen partial pressures were 88 psi for Reactor 1 and 84 psi for Reactor 2. The simulation was based on two years of commercial reactor runs of two different reactors making different PE's.

TABLE 1

|  | Reactor 1 RMI Reduction (kg/Tonne) | Reactor 2 RMI Reduction (kg/Tonne) |
| --- | --- | --- |
| +5 PSI | 0.20 | 0.20 |
| +10 PSI | 0.40 | 0.45 |
| +15 PSI | 0.57 | 0.65 |
| +20 PSI | 0.73 | 0.81 |
| +25 PSI | 0.93 | 1.01 |
| +30 PSI | 1.09 | 1.21 |

Examples 2 and 3. Prophetic Examples

Examples 2 and 3 illustrate increased inert gas partial pressure with respect to reference inert gas partial pressure, comparing Example 3 to Example 2. Examples 2 and 3 further illustrate reduction in hydrocarbon losses in the direct gas vent, comparing Example 3 to Example 2.

General Procedure of Material Balance

All the compositions are in mole %. In comparing Example 2 and Example 3, the kilomoles nitrogen (N2) in the feed stream and the total amount of polyethylene made stays the same. The kilomoles ethylene (C2), hydrogen (H2), isopentane (iC5) (in this example, iC5 is an ICA), and 1-hexene (C6) are all lower in Example 3 as compared to Example 2. To control the system, that is to control the partial pressure of C2, the partial pressure of H2, the partial pressure of iC5, and the partial pressure of C6 that are desired, one closes the material balance. The amount of nitrogen fed to the reactor is set at a value to sweep the catalyst into the reactor properly. But the components removed from the reactor are set by removal of product polymer and removal of nitrogen. So that dictates how much C2, H2, iC5, and C6 get removed from the reactor. So the change in material equals net zero based on the feeds. So upstream what is put into the reactor is adjusted so that what is put into the reactor balances what is leaving the reactor. In going from Example 2 at 312 psig total pressure to Example 3 at 350 psig total pressure, unless the flow rates are changed for the various components fed into the reactor (C2, H2, iC5, and C6) the partial pressures of the components change just by changing the total pressure. So, the flows of each of the aforementioned components are changed in order to maintain the same partial pressure for each component. But because the flow rate of the nitrogen is not adjusted, the partial pressure of nitrogen is raised by raising the total pressure. That is why the ethylene drops from 40% to 36% from Example 2 to Example 3. While the partial pressure of ethylene (in terms of its numeric value) is the same, there is a greater partial pressure of nitrogen. So on the basis of 100%, when the partial pressure of nitrogen increases on a percentage basis, the other components decrease on a percentage basis, but remain at the same partial pressure. The reaction rate depends on the partial pressure of the ethylene. Because the partial pressure of ethylene is not changed, the amount of product polymer made does not change.

Of the 14.3 kilomoles nitrogen in Examples 2 and 3, approximately 4.3 is added through nitrogen-fluidized catalyst addition, approximately 3 kilomoles is added through dissolved-nitrogen feed addition, and approximately 7 kilomoles is added through discharge-mediated nitrogen addition.

It will be understood that Examples 2 and 3 do not include dissolved losses. Polyethylene is absorbent. Based on the partial pressures of iC5 and C6 in the reactor, the polyethylene absorbs a certain amount into itself that eventually is removed. But that is not counted into what is being fed or removed from the reactor because that does not change with nitrogen partial pressure. This allows the numbers to more directly illustrate the present technology since the focus is on gas venting. However, one of ordinary skill in the art will be able to incorporate dissolved losses into the material balance.

Example 2. Reference Process Conditions

This example illustrates reference process conditions. The total reactor pressure is 312 psig. The flows are on a one hour basis. The vent column has a nitrogen capacity of 3.6 kilomoles/hr. The amount of polyethylene produced is 11.7 moles of approximately 6 million molecular weight polymer.

The compositions of the streams are given in Table 2 in mole %.

TABLE 2

|  | input | vent column | direct vent | product discharge system |
| --- | --- | --- | --- | --- |
| ethylene | 40% | 5% | 40% | 50% |
| hydrogen | 10% | 10% | 10% | 12% |
| nitrogen | 35% | 85% | 35% | 20% |
| Isopentane | 10% |  | 10% | 12% |
| 1-hexene | 5% |  | 5% | 6% |

The flow amounts are given in Table 3 in kilomoles.

TABLE 3

|  | Input | vent column | direct vent | product discharge system |
| --- | --- | --- | --- | --- |
| Ethylene | 2523 | 0.2 | 3.5 | 19.3 |
| Hydrogen | 2.9 |  | 0.4 | 2.4 |
| Nitrogen | 14.3 | 3.6 | 3.1 | 7.6 |
| Isopentane | 5.7 |  | 0.9 | 4.8 |
| 1-hexene | 6.2 | 0.4 | 0.9 | 4.8 |

Example 3. Maximum Safe Pressure Conditions

This example illustrates maximum safe pressure process conditions. No direct venting is required. The total reactor pressure is 350 psig. The flows are on a one hour basis. The vent column has a nitrogen capacity of 3.6 kilomoles/hr. The amount of polyethylene produced is 11.7 moles of approximately 6 million molecular weight polymer.

The compositions of the streams are given in Table 4 in mole %.

TABLE 4

|  | input | vent column | direct vent | product discharge system |
| --- | --- | --- | --- | --- |
| ethylene | 36% | 5% | NA | 44% |
| hydrogen | 9% | 10% | NA | 11% |
| nitrogen | 42% | 85% | NA | 28% |
| isopentane | 9% |  | NA | 11% |
| 1 hexene | 4% |  | NA | 6% |

The flow amounts are given in Table 5 in kilomoles/hr.

TABLE 5

| | input | vent column | direct vent | product discharge system |
|---|---|---|---|---|
| ethylene | 2517.5 | 0.2 | NA | 17.3 |
| hydrogen | 2.2 | | NA | 2.2 |
| nitrogen | 14.3 | 3.4 | NA | 10.9 |
| isopentane | 4.3 | | NA | 4.3 |
| 1 hexene | 4.7 | 0.4 | NA | 4.3 |

One or more specific embodiments of the OPTIMIZED INERT GAS PARTIAL PRESSURE IN A GAS PHASE POLYMERIZATION PROCESS have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Numbers disclosed herein are approximate values, regardless whether the word "about" or "approximate" is used in connection therewith. Whenever a numerical range with a lower limit and an upper limit is disclosed, any number falling within the range is specifically disclosed. Whenever the term "includes" is used it encompasses "includes, but is not limited to." All documents described herein are incorporated by reference herein for purposes of all jurisdictions where such practice is allowed to the extent they are not inconsistent with this text.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A gas phase polymerization process, comprising:
   contacting an input stream comprising a monomer and an induced condensing agent in the presence of an inert gas with a catalyst in a fluidized bed reactor to produce a polymer, unreacted monomer, and an output gas;
   recycling a recycle stream of the unreacted monomer from the reactor to the input stream;
   venting at least a portion of the output gas from the reactor; and
   maintaining a partial pressure of the inert gas in the reactor above a reference inert gas pressure to decrease losses of the recycle stream with the vented output gas.

2. The gas phase polymerization process of claim 1, further comprising maintaining a total reactor pressure above a reference total reactor pressure.

3. The gas phase polymerization process of claim 1, further comprising maintaining a partial pressure of the monomer in the reactor at a reference monomer pressure and maintaining a partial pressure of the induced condensing agent in the reactor at a reference induced condensing agent pressure.

4. The gas phase polymerization process of claim 2, wherein maintaining the total reactor pressure comprises controlling the venting of at least some of the output gas from the reactor.

5. The gas phase polymerization process of claim 1, wherein the venting comprises passing the produced polymer, at least a portion of the unreacted monomer, at least a portion of the induced condensing agent, and at least a portion of the output gas to a product discharge system.

6. The gas phase polymerization process of claim 1, where the venting comprises stripping the unreacted monomer from at least a portion of the output gas in a stripping column.

7. The gas phase polymerization process of claim 1, wherein the venting comprises directly venting at least a portion of the output gas from the reactor.

8. The gas phase polymerization process of claim 2, wherein the total reactor pressure is up to a maximum safe pressure for the reactor.

9. The gas phase polymerization process of claim 8, wherein the maximum safe pressure is less than the rated pressure for the reactor.

10. The gas phase polymerization process of claim 9, further comprising activating a relief device when the total reactor pressure exceeds the rated pressure.

11. The gas phase polymerization process of claim 1, wherein the process is a polyolefin polymerization process wherein the monomer comprises an olefin and the polymer comprises a polyolefin.

12. The gas phase polymerization process of claim 1, wherein the process is a polyethylene polymerization process, wherein the olefin comprises ethylene and the polymer comprises polyethylene or a polyethylene copolymer.

13. The gas phase polymerization process of claim 1, wherein the inert gas is nitrogen.

14. The gas phase polymerization process of claim 1, wherein the monomer comprises at least one of ethylene, 1-butene, 1-hexene, or combinations thereof.

15. The gas phase polymerization process of claim 1, wherein the induced condensing agent comprises at least one of isobutene, isopentane, or combinations thereof.

16. The gas phase polymerization process of claim 1, wherein the catalyst comprises at least one of a Ziegler-Natta catalyst, a metallocene catalyst, a chromium catalyst, or combinations thereof.

17. A gas phase polyethylene polymerization process, comprising:
- contacting an input stream comprising ethylene and an induced condensing agent in the presence of nitrogen with a Ziegler-Natta, metallocene, or chromium catalyst in a reactor to form (i) a polyethylene homopolymer or copolymer, (ii) unreacted ethylene, and (iii) an output gas;
- recycling a recycle stream of the unreacted ethylene from the reactor to the input stream;
- venting at least a portion of the output gas from the reactor; and
- maintaining a partial pressure of the nitrogen in the reactor above a reference nitrogen partial pressure to decrease losses of the recycle stream with the vented output gas.

18. The gas phase polymerization process of claim 17, further comprising maintaining a partial pressure of the ethylene in the reactor at a reference ethylene pressure and maintaining a partial pressure of the induced condensing agent in the reactor at a reference induced condensing agent pressure.

19. The gas phase polymerization process of claim 17, further comprising maintaining a total reactor pressure above a reference total reactor pressure.

20. A gas phase polyolefin polymerization process, comprising:
- contacting an input stream comprising an olefin monomer and an induced condensing agent in the presence of nitrogen with a Ziegler-Natta, metallocene, or chromium catalyst in a reactor to form a polyolefin, unreacted olefin, and output gas;
- recycling a recycle stream of the unreacted olefin monomer from the reactor to the input stream;
- venting at least a portion of the output gas from the reactor;
- maintaining a partial pressure of the nitrogen in the reactor above a reference inert gas pressure to decrease losses of the recycle stream with the vented output gas; and
- maintaining a total reactor pressure above a reference total reactor pressure, while maintaining a partial pressure of the olefin monomer in the reactor at a reference olefin monomer pressure and maintaining a partial pressure of the induced condensing agent in the reactor at a reference induced condensing agent pressure.

* * * * *